United States Patent [19]

Nilson

[11] 3,966,308

[45] June 29, 1976

[54] DEVICE FOR REFLECTING RADIANT ENERGY

[75] Inventor: Hans Erik Nilson, Vargon, Sweden

[73] Assignee: Infrarodteknik AB, Vanersborg, Sweden

[22] Filed: May 1, 1974

[21] Appl. No.: 466,035

[52] U.S. Cl. .............................. 350/293; 350/288; 350/296; 240/41.35 R
[51] Int. Cl.² .......................................... G02B 5/10
[58] Field of Search ............. 350/293, 310, 63, 288, 350/296; 331/94.5 P; 240/41.35 R

[56] References Cited
UNITED STATES PATENTS

| | | | |
|---|---|---|---|
| 1,988,952 | 1/1935 | Meyer | 350/293 |
| 2,152,394 | 3/1939 | Veeder | 350/310 |
| 2,719,327 | 10/1955 | Pique | 350/293 |

FOREIGN PATENTS OR APPLICATIONS

| | | | |
|---|---|---|---|
| 340,257 | 11/1971 | Sweden | 350/293 |

Primary Examiner—R. V. Rolinec
Assistant Examiner—Michael J. Tokar
Attorney, Agent, or Firm—Michael J. Striker

[57] ABSTRACT

A device for reflecting radiant energy comprises a housing having two substantially mirror-symmetrical housing sections, each being provided with a curved supporting surface. The two housing sections are connected to one another so that the supporting surfaces face one another defining a concave cavity in the housing, the cavity being open toward the exterior of the housing. A reflecting element is situated in the cavity and supported on the supporting surfaces in substantial conformity therewith, the marginal portions thereof being received into recesses adjacent to the open side of the cavity. The housing may be elongated and the generatrices of the supporting surfaces may extend in parallel to the axis of the housing, and an elongated source of radiant energy may be accommodated in the cavity and extend parallel to the axis of the housing. A cooling system may be arranged between the housing sections or within the same so as to cool the supporting surfaces thereof.

11 Claims, 5 Drawing Figures

DEVICE FOR REFLECTING RADIANT ENERGY

BACKGROUND OF THE INVENTION

The present invention relates to a device for reflecting radiant energy and more particularly, the present invention relates to a device for reflecting radiant energy comprising an elongated source of radiant energy and a housing comprising two sections defining with one another an elongated cavity surrounding the source of radiant energy.

Similar devices for reflecting radiant energy are already known, for instance from the U.S. Pat.No. 3,654,471, which discloses a reflector device in which a profiled holder is formed as a body having a cavity that is provided with a supporting surface for a reflecting metal strip. The reflecting metal strip is secured to the holder by stop members integral with the body of the holder and elastically deflecting the metal strip against the supporting surface. While this arrangement achieves satisfactory results so long as the temperature of the reflecting metal strip does not exceed a relatively low limiting temperature, the rise in temperature above this limiting temperature causes the metal strip to deform, whereby the operation of the device is adversely affected and, in some instances, the device may suffer permanent damage.

SUMMARY OF THE INVENTION

It is an object of the present invention to provide a device for reflecting radiant energy which avoids the disadvantages of the prior art devices.

It is a further object of the present invention to provide a device for reflecting radiant energy which may be used in much wider range of temperatures and radiant energy than heretofore possible.

Still another object of the present invention is to provide a device for reflecting radiant energy in which the reflecting element is prevented from suffering undue deformation.

It is yet another object of the present invention to provide a device for reflecting radiant energy with a cooling system for reducing the temperature of the reflecting element.

It is a concomitant object of the present invention to provide a device for reflecting radiant energy which permits reflecting of much higher radiant energies than heretofore possible.

In pursuance of these objects and others which will become apparent hereafter, the invention resides, briefly stated, in a device for reflecting radiant energy comprising a housing having two substantially mirror-symmetrical housing sections, each having a curved supporting surface. The two housing sections are mounted so that the supporting surfaces thereof face each other and define with one another a concave cavity having an open side. At least one projecting portion is provided in each housing section adjacent to said open side and is provided with at least one recess facing into the cavity. A reflecting element is situated in the cavity and is supported on the supporting surfaces of the housing sections in substantial conformity therewith and has at least one marginal portion received in the recesses of said housing sections. A groove extends between each recess and the associated supporting surface so that the marginal portions of the reflecting strip are partially received in the groove, either immediately after the two housing sections are assembled or after the temperature of the reflecting strip has been increased during the operation of the device.

In the currently preferred embodiment of the present invention, the housing is elongated and has a longitudinal axis, and the recesses and grooves as well as the generatrices of the supporting surfaces of the housing sections extend substantially parallel to the axis of the housing. In this embodiment, the reflecting element is strip-shaped, and has two marginal portions which are received into the respective recesses of the housing sections. The width of the reflecting strip-shaped element, that is the distance between the two marginal portions thereof, is so selected as to substantially correspond to the sum of the arc lengths of the supporting surfaces and the depths of the recesses. In this manner, when the two housing sections are assembled, the reflecting element is securely retained in the recesses of the housing sections and pressed thereby against the supporting surfaces so that it conforms therewith. Preferably, a source of radiant energy, which may be elongated, is accommodated in the cavity so that the longitudinal axis of the elongated source substantially coincides with the longitudinal axis of the housing. On the other hand, it is also possible to locate the source of radiant energy outside of the housing and to locate an object whose temperature is to be elevated in the focus of the reflecting element.

During the operation of the device, the radiant energy rays impinging upon the reflecting strip and being reflected thereby cause an elevation of the temperature thereof. As the temperature of the reflecting element increases, the overall dimensions of the reflecting element also increase as a result of thermal expansion of the material of the reflecting element. Since the reflecting element is securely retained in the recesses of the two housing sections, even at a normal or room temperature, it is necessary to compensate for this change in dimensions. The grooves provided immediately adjacent the recesses provide for such a compensation. Namely, as the temperature of the reflecting strip increases, the pressure with which the reflecting strip is pressed against the supporting surfaces also increases; however, the supporting surfaces do not permit the reflecting elements to yield, so that the only regions in which the reflecting strip is unsupported and can yield are the regions of the grooves and, consequently, the marginal portions of the reflecting element will deflect into the grooves. The dimensions of the grooves are such that they are capable of accepting the marginal portions of the reflecting strip even under extremely severe conditions.

Even better results are achieved when the width of the reflecting element is slightly larger than the arc length of the supporting surfaces combined with the depth of the recesses in the assembled condition of the housing of the device. In this event, as the housing is assembled, a certain amount of prestressing is imparted to the reflecting element so that it will to some extent deflect into the grooves. The prestressing of the reflecting element assures that the reflecting element will be safely pressed against the supporting surfaces and exactly conform to the shape thereof.

Since the grooves are provided at the same side of the reflecting element as the supporting surfaces, that is since they bulge out in the same direction as the supporting surfaces are curved, the marginal portions of the reflecting strip-shaped element will readily yield and enter into the grooves either during the assembling of the two housing sections due to the pressure applied to the reflecting strip as the result of the mounting of the housing sections, or during the operation of the device due to the thermal expansion of the reflecting element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
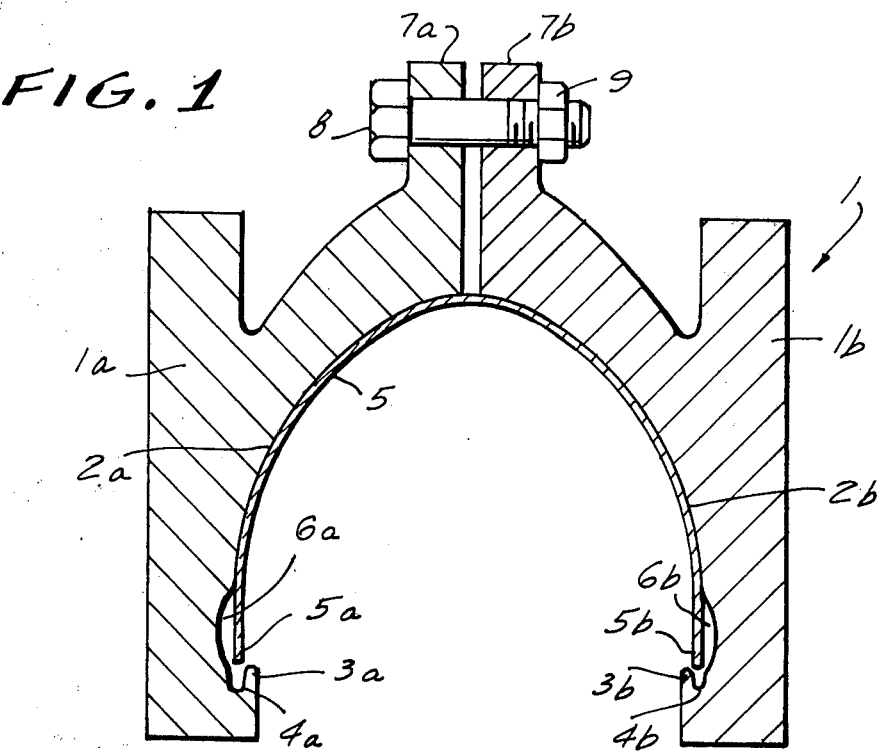
FIG. 1 is a cross-sectional view of one embodiment of the device according to the invention prior to the tightening of the mounting means.

Discussing the drawing in detail, and firstly the embodiment illustrated in FIG. 1, it will be seen that the device for reflecting radiant energy according to the invention comprises a housing 1 which includes two substantially mirror-symmetrical sections 1a and 1b which are provided with curved supporting surfaces 2a and 2b, respectively, so that, when the housing 1 is assembled, the curved supporting surfaces 2a and 2b together define a cavity in the housing 1 having an open end. In the regions adjacent to the open end of the cavity, there are provided projections 3a and 3b which are provided with respective recesses 4a and 4b. A reflecting element 5 is accommodated in the cavity defined by the supporting surfaces 2a and 2b of the housing sections 1a and 1b, and abuts against the supporting surfaces 2a and 2b. The first embodiment of the invention is illustrated in FIG. 1 in its partially assembled condition, that is after the reflecting element 5 has been inserted into the cavity of the housing 1. It may be seen that in this partially assembled condition the reflecting element 5, which has marginal portions 5a and 5b, abuts against the supporting surfaces 2a and 2b, and the marginal portions 5a and 5b are located adjacent to the recesses 4a and 4b.

Grooves 6a and 6b, the function of which will be described later on, are provided in the respective housing sections 1a and 1b, adjacent to and co-extensive with the recesses 4a and 4b. The two housing sections 1a and 1b may be provided with flanges 7a and 7b, respectively, and a plurality of attachment elements, such as screws 8 and nuts 9, may be provided in the region of the flanges 7a and 7b and connect the housing sections 1a and 1b to one another. In the position illustrated in FIG. 1, the housing sections 1a and 1b are spaced apart a certain distance and the attaching elements 8 and 9 are not tightened. Consequently, the arc length of the supporting surfaces 2a and 2b is augmented by the above-mentioned distance so that it exceeds the arc length of the reflecting element 5. Once the attaching elements 8 and 9 are tightened, the surfaces of the flanges 7a and 7b contact each other so that the distance between the housing sections 1a and 1b is eliminated, and the arc length of the supporting surfaces 2a and 2b together with the depth of the recesses 4a and 4b equals, or is slightly shorter than, the arc length of the reflecting element 5. The result of this arrangement is that when the attaching elements 8 and 9 are tightened, the reflecting element 5 is pressed against the supporting surfaces 2a and 2b, and the marginal portions 5a and 5b thereof are securely retained in the recesses 4a and 4b.

Figure 2:
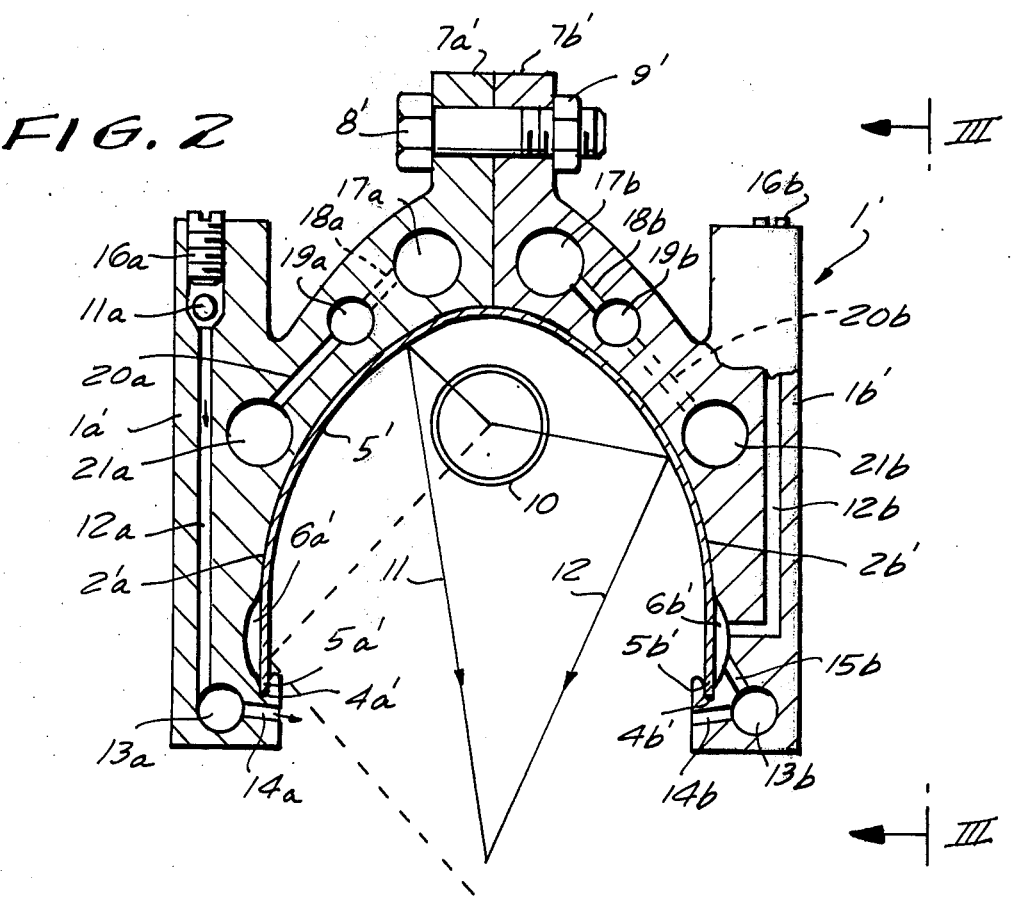
FIG. 2 is a cross-sectional view of a second embodiment of the device according to the invention after the tightening of the mounting means.

FIG. 2 illustrates a second embodiment of the device according to the invention in its tightened condition, that is in a condition in which the attaching elements are tightened and the contact surfaces of the flanges contact each other. The second embodiment of the invention is in many respects similar to that discussed above, so that similar numerals supplemented with a prime have been assigned to corresponding parts. In this embodiment, the attaching means 8' and 9' are tightened, so that the contact surfaces of the flanges 7a' and 7b' contact one another. The marginal portions 5a' and 5b' of the reflecting element 5' are received in the recesses 4a' and 4b' of the housing sections 1a' and 1b', and the reflecting element 5' is pressed against the respective supporting surfaces 2a' and 2b' of the housing sections 1a' and 1b'. A source of radiant energy 10 may be situated in the cavity of the housing 1', and in the currently preferred embodiment of the invention, the source 10 is elongated and has a longitudinal axis, the generatrices of the supporting surfaces 2a' and 2b' and the recesses 4a' and 4b' extending parallel to the longitudinal axis of the source 10. In this embodiment, the reflecting element 5' is strip-shaped and has two marginal portions 5a' and 5b' which are received and retained in the respective recesses 4a' and 4b' of the housing sections 1a' and 1b'. The reflecting element 5' has an effective reflecting surface, and the reference numerals 11 and 12 designate two different rays emitted by the source 10 and reflected by the effective surface of the reflecting element 5' into the focus F. The regions of the reflecting element 5' outside of the effective surface are not used for focussing the rays into the focus F, and the reference numeral 13 indicates a ray emitted by the source 10 and reaching the reflecting element 5' outside of the effective surface thereof.

Grooves 6a' and 6b' which are situated adjacent to the recesses 4a' and 4b' and are coextensive therewith will now be discussed in greater detail, particularly as for as their function is concerned. The width of the reflecting element 5', that is the distance between the marginal portions 5a' and 5b' corresponds to, or is slightly larger than the combined arc length of the supporting surfaces 2a' and 2b' and the depth of the recesses 4a' and 4b'. When the housing sections 1a' and 1b' are assembled and the fastening means 8' and 9' are tightened, the marginal portions 5a' and 5b' enter into and are retained by the recesses 4a' and 4b'. When the width of the reflecting element 5' is slightly larger than the arc length of the supporting surfaces 2a' and 2b' supplemented by the depth of the recesses 4a' and 4b', the reflecting element 5' will be pressed against the supporting surfaces 2a' and 2b' to conform to the contour thereof. However, any excess width of the reflecting element 5' will have to be compensated for, and this is where the grooves 6a' and 6b' are utilized. Namely, the marginal portions 5a' and 5b' are not supported in any manner in the region of the grooves 6a' and 6b' so that they are free to yield and deflect into grooves 6a' and 6b' to thereby compensate for the excess width of reflecting element 5'. In this manner, it is assured that the reflecting element 5' will conform with the contour of the supporting surfaces 2a' and 2b' by virtue of its being pressed against those surfaces, but undue stresses in the reflecting element 5' are avoided due to the fact that the excessive width thereof is accepted in the grooves 6a' and 6b'. However, it is also possible that the width of the reflecting element 5' may be equal to the arc length of the supporting surfaces 2a' and 2b', combined with the depth of the recesses 4a' and 4b', when the housing sections 1a' and 1b' are assembled, so that the marginal portions 5a' and 5b' will be safely retained in the grooves 4a' and 4b' without, however, the reflecting element 5' being pressed against the supporting surfaces 2a' and 2b'. If so desired, the width of the reflecting element 5' may even be slightly shorter than the above mentioned dimension, in which case the reflecting element 5' will be free to move to some extent during the time that the device is out of operation, while the thermal expansion of the material of the reflecting element during the operation of the device results in a secure support of the reflecting element 5'.

During the operation of the device, the temperature of the reflecting element 5' will rise as a result of the heat energy emitted by the source 10 and absorbed by the reflecting element 5', which will in turn result in thermal expansion of the material of the reflecting element 5'. More particularly, also the width of the reflecting element 5' will increase so that, if no grooves 6a' and 6b' were provided, this would result in undue stressing of the material of the reflecting element 5'. However, because of the presence of the grooves 6a' and 6b', the reflecting element 5' is free to deflect into the grooves 6a' and 6b', so as to compensate for the increase in the width of the reflecting element 5' due to the elevation of the temperature thereof. Consequently, the device according to the invention may be used within a wide range of temperatures of the reflecting element 5', and is particularly suitable for emission of high radiant energies which would otherwise result in a deformation or destruction of the reflecting element 5'.

However, the device according to the invention may also be used for emiting radiant energy which does not result in any substantial increase in the temperature of the reflecting element 5'. When this is true, particularly when the source 10 emits relatively cool radiant energy, then the grooves 6a' and 6b' may be omitted without any detrimental effects to the device. While only the function of the grooves 6a' and 6b' has been described, it is to be understood that the above-mentioned grooves 6a and 6b and the later discussed grooves 6a'' and 6b'' serve a similar purpose, so that it is not necessary to discuss those grooves in any detail.

The amount of radiant energy which may be emitted by the source 10 may be even further increased if the sections 1a' and 1b' are provided with cooling arrangements. One of such cooling arrangements is illustrated in the lefthand side of FIG. 2, and comprises an inlet duct 11a, a connecting duct 12a, a distributor duct 13a and at least one outlet duct 14a or a plurality of such outlet ducts. The cooling fluid, such as cooling air, is introduced into the inlet duct 11a, passes through the connecting duct 12a cooling the housing section 1a' during its passage through the duct 12a, enters the distributor duct 13a and emerges therefrom through the outlet ducts 14a. Since the cooling medium is ejected across the open end of the cavity in the housing 1', not only does a portion of this cooling medium contact and cool the internal surface of the reflecting element 5', but another portion of the ejected cooling medium also prevents dust from entering the cavity and depositing on the internal surface of the element 5'. The quantity of the cooling medium may be determined by various control elements, such as a control screw 16a which is arranged to partially close the inlet duct 11a so as to reduce the amount of cooling medium passing through the cooling arrangement.

On the right-hand side of FIG. 2, there is shown an alternative cooling arrangement in which the connecting duct 12b communicates with the groove 6b and a further duct 15b is provided which establishes communication between the groove 6b' and distributing duct 13b'. In this arrangement, the marginal portions 5b' of the element 5' are also being cooled by the cooling medium as it passes through the grooves 6b' on its way from the duct 12b and into the distributing duct 13b. Of course, this results in a more effective cooling of the element 5'.

Figure 3:
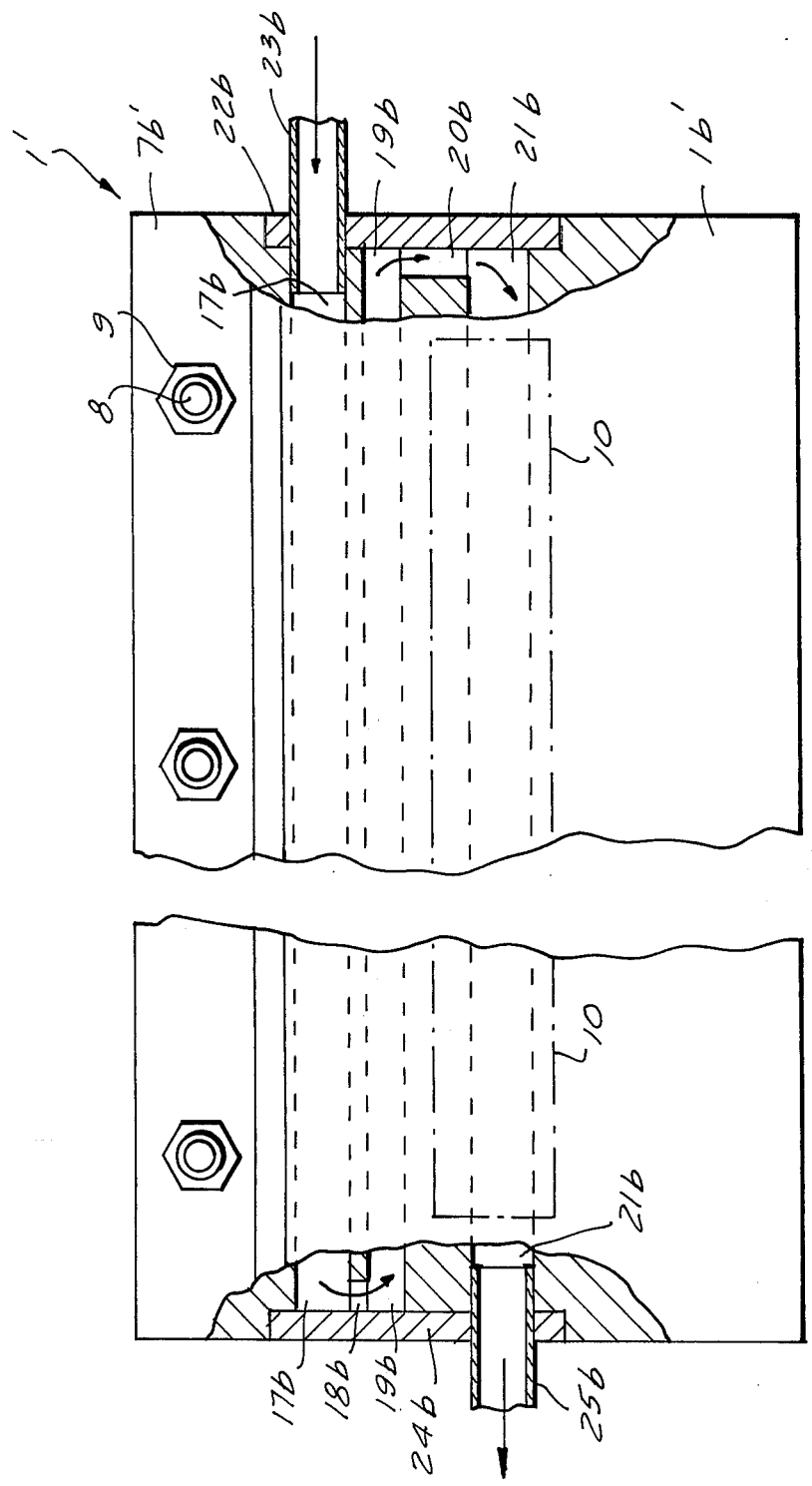
FIG. 3 is a partially sectioned side view of the second embodiment of the invention, taken on line III—III of FIG. 2.

A different cooling arrangement which may be used instead of, or in addition to, the aforedescribed cooling arrangement is illustrated in FIGS. 2 and 3. This cooling arrangement will now be described with reference to the section 1b', the cooling arrangement in section 1a' being similar thereto. It includes three ducts 17b, 19b, 21b extending longitudinally of the housing and two connecting ducts 18b and 20b. One end of each of the longitudinal ducts 17b, 19b, 21b may be closed by a closing plate 22b, which is provided with an opening accommodating an inlet tube 23b, through which the cooling medium is introduced into the cooling arrangement, to pass through the ducts 17b, 18b, 19b, 20b and 21b. The other ends of the ducts 17b, 19b, and 21b may be closed by a different closing plate 24b which supports an outlet tube 25b through which the expended cooling medium leaves the housing section 1b'. It may be seen that the duct 17b is located in the region of the section 1b' which is closest to the source 10 and thus subjected to the highest heat effects, while the duct 21b is located in a region of the housing 1b' which is relatively distant from the source 10 so that the fact that the expended cooling medium in this duct is at a higher temperature than at the inlet does not have any detrimental effects.

Figure 4:
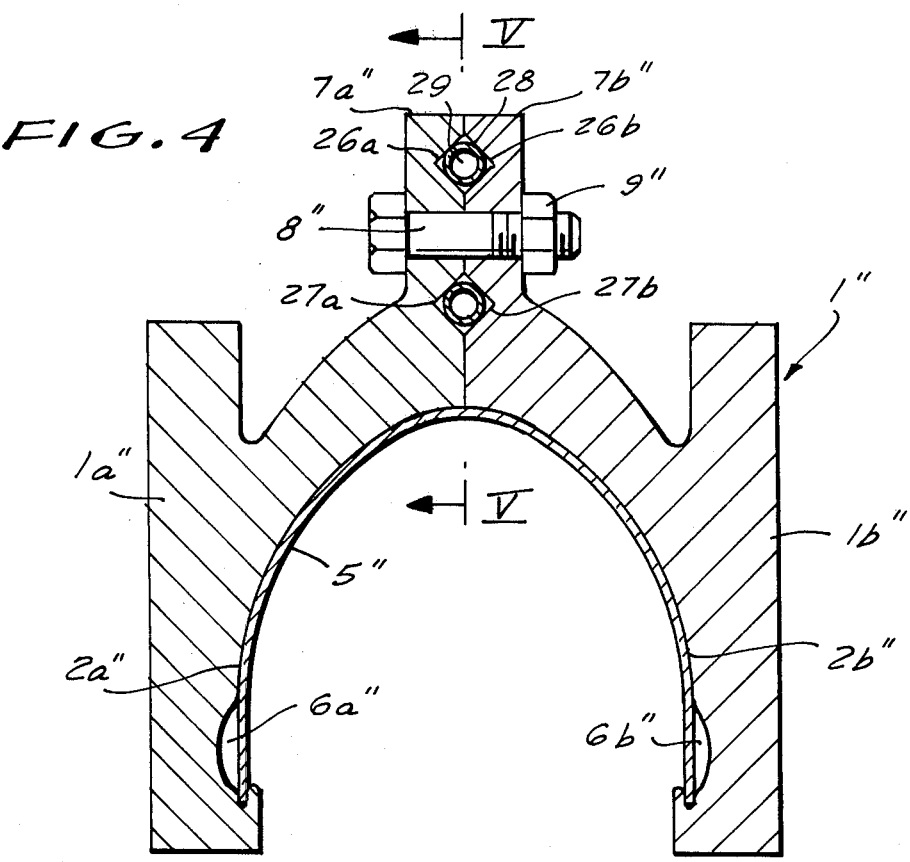
FIG. 4 is a cross-sectional view of a third embodiment of the device according to the invention.
Figure 5:
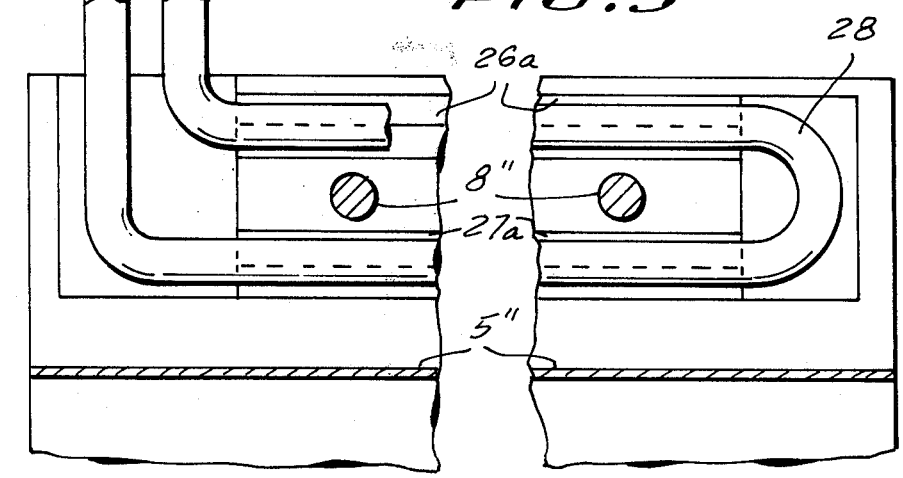
FIG. 5 is a fragmented longitudinally sectional view of the third embodiment of the invention, taken on line V—V of FIG. 4.

Coming now to the embodiment illustrated in FIGS. 4 and 5, in which similar parts have been assigned similar reference numerals but supplemented with a double prime, it may be seen that, in this embodiment, the device for reflecting radiant energy includes a different cooling system provided between the flanges 7a'' and 7b'' of the respective housing sections 1a'' and 1b''. The contacting surfaces of the flanges 7a'' and 7b'' in this embodiment are provided with recesses 26a and 26b which are illustrated as being substantially V-shaped and with additional recesses 27a and 27b of a similar configuration. A tube 28 defining a cooling channel 29 is accommodated in the respective V-shaped recesses 26a and 26b, 27a and 27b, and when the attaching means 8'' and 9'' are tightened, the tube 28 is securely retained therein. The cooling medium enters the tube 28 through the inlet portion 30 and leaves the same through the outlet portion 31, so that the coolest medium again passes closer to the supporting surfaces 2a'' and 2b'', while the already expended cooling medium leaves the section 1a'' after passing through a portion of the cooling tube 28 which is spaced apart from the supporting surfaces 2a'' and 2b''.

The particular shape of the recesses 26a, and 26b and 27a and 27b is of no critical importance except for the fact that if the recesses are V-shaped, sufficient localized pressures are applied to the tube 28 to cause the same to deform and to be securely retained in the recesses. It is pointed out that this alternative cooling system may be used either instead of the above-described cooling systems or in addition thereto, should there be a need for intense cooling of the housing sections and of the reflecting element.

It may be seen that the device according to the invention is easy to assemble and reliable during operation. Moreover, when the housing sections are manufactured as extruded profiled aluminum bodies, when the reflecting strip is a cold-rolled metal strip and when the tube 28 is made of copper, these various parts of the device according to the invention are also easy to manufacture which contributes to low overall cost of the device.

It will be understood that each of the elements described above, or two or more together, may also find a useful application in other types of reflecting device constructions differing from the types described above.

While the invention has been illustrated and described as embodied in a device for reflecting radiant energy, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for reflecting energy comprising, in combination, two substantially mirror-symmetrical housing sections, each having a curved supporting surface which forms with the supporting surface of the other housing section a substantially continuous support surface defining a cavity having an open end when said housing sections are assembled to constitute a housing; at least one portion in each housing section at said open end and projecting into said cavity of said housing and provided with at least one recess; a reflecting element in said housing in abutment and substantial conformity with said supporting surfaces and having at least one marginal portion; and means for drawing said housing sections towards one another so that said marginal portion of said reflecting element enters said recess of said housing sections during the drawing of the latter together to constitute said housing, and is retained in said recesses of said housing whereby said reflecting element is connected to said housing.

2. A combination as defined in claim 1, wherein each of said recesses has a depth and said support surface has an arc length in a plane normal to the plane of symmetry of said housing and including an axis of symmetry, the combined depths and arc length constituting a first dimension; wherein said reflecting element is flexible and has a second dimension in said normal plane; and further comprising means for partially accommodating said marginal portion of said reflecting element and including grooves provided in said supporting surfaces adjacent said recesses and into which said marginal portion of said reflecting element deflects when said second dimension exceeds said first dimension.

3. A combination as defined in claim 1, wherein said supporting surfaces are provided with grooves in the regions adjacent said recesses and partially accommodating said marginal portion of said reflecting element.

4. A combination as defined in claim 2; wherein said marginal portion deflects into said grooves in response to drawing of said sections together.

5. A combination as defined in claim 2, wherein said marginal portion deflects into said grooves in response to an increase in temperature of said reflecting element.

6. A combination as defined in claim 1, and further comprising a source of radiant energy accommodated in said cavity.

7. A combination as defined in claim 1, wherein said housing has a longitudinal axis; wherein the generatrices of said supporting surfaces and said recesses extend parallel to said longitudinal axis; and werein said reflecting element is strip-shaped and has two marginal portions, each received in one of said recesses.

8. A combination as defined in claim 7, and further comprising an elongated source of radiant energy accommodated in said cavity and extending parallel to said longitudinal axis.

9. A combination as defined in claim 1, and further comprising a cooling arrangement in said housing; and a source of cooling fluid outside said housing and communicating with said cooling arragement.

10. A combination as defined in claim 9, wherein each of said housing sections includes a flange having a contact surface juxtaposed with the contact surfaces of the other housing section, said contact sufaces being provided with coextensive associated channels; and wherein said cooling arrangement includes at least one cooling tube accommodated in said channels.

11. A combination as defined in claim 9, wherein said cooling arrangement includes at least one cooling channel for the cooling fluid in each of said housing sections and situated adjacent to the respective support surface thereof.

* * * * *